United States Patent [19]

Anthony

[11] Patent Number: 4,513,038

[45] Date of Patent: Apr. 23, 1985

[54] MULTILAYER FILM HAVING A LAYER OF LOW PRESSURE, LOW DENSITY HETEROGENEOUS ETHYLENE COPOLYMERS

[75] Inventor: John Anthony, Downers Grove, Ill.

[73] Assignee: Union Carbide Corporation, Danbury, Conn.

[21] Appl. No.: 577,801

[22] Filed: Feb. 7, 1984

Related U.S. Application Data

[62] Division of Ser. No. 317,936, Nov. 3, 1981, Pat. No. 4,464,426.

[51] Int. Cl.$^3$ .............................................. B32B 27/00
[52] U.S. Cl. ..................................... 428/35; 383/109; 428/349; 428/516; 428/216; 428/218; 156/244.11
[58] Field of Search ................ 428/516, 349, 35, 218, 428/216; 156/244.11; 383/109

[56] References Cited

U.S. PATENT DOCUMENTS

| | | | |
|---|---|---|---|
| 2,928,756 | 3/1960 | Campbell | 428/215 |
| 3,694,524 | 9/1972 | Tinger et al. | 260/897 |
| 4,000,234 | 12/1976 | Pilgrim et al. | 264/94 |
| 4,076,698 | 2/1978 | Anderson et al. | 526/348.6 |
| 4,160,053 | 7/1979 | Clayton | 428/516 |
| 4,205,021 | 5/1980 | Morita et al. | 525/240 |
| 4,243,619 | 1/1981 | Fraser et al. | 264/40.6 |
| 4,256,784 | 3/1981 | Gebhardt et al. | 428/516 |
| 4,303,708 | 12/1981 | Gebhardt et al. | 428/516 |
| 4,329,388 | 5/1982 | Vicik et al. | 428/516 |
| 4,339,493 | 7/1982 | Weiner | 428/349 |
| 4,339,498 | 7/1982 | Weiner | 428/349 |
| 4,339,507 | 7/1982 | Kurtz et al. | 428/522 |
| 4,346,834 | 8/1982 | Mazumdar | 428/35 |
| 4,356,221 | 10/1982 | Anthony et al. | 428/35 |
| 4,359,561 | 11/1982 | Fraser et al. | 526/88 |
| 4,364,981 | 12/1982 | Horner et al. | 428/35 |
| 4,367,256 | 4/1983 | Biel | 428/516 |
| 4,444,828 | 4/1984 | Anthony et al. | 428/218 |

Primary Examiner—Marion E. McCamish
Assistant Examiner—E. Rollins Buffalow
Attorney, Agent, or Firm—John C. LeFever; Real J. Grandmaison

[57] ABSTRACT

A multilayer plastic film suitable for use in the manufacture of garbage and trash bags wherein the film comprises at least one layer of a high pressure low density polyethylene, and a layer comprising low pressure low density gas phase heterogeneous copolymers formed from ethylene, and at least one of propylene and butene-1 and at least one $C_5$–$C_8$ comonomer.

21 Claims, No Drawings

MULTILAYER FILM HAVING A LAYER OF LOW PRESSURE, LOW DENSITY HETEROGENEOUS ETHYLENE COPOLYMERS

This application is a division of prior U.S. application Ser. No. 317,936, filed Nov. 3, 1981, now U.S. Pat. No. 4,464,426.

This invention relates to a multilayer plastic film, and more particularly, to a multilayer plastic film suitable for the manufacture and use as garbage and trash bags.

In general, plastic garbage and trash bags for bulk waste material may be produced in film form from various polymers such as polyethylene. The films used for such bags should desirably possess high strength characteristics such as puncture toughness, tensile strength and Elmendorf tear strength. Another desirable property of plastic bags is low manufacturing cost. It will be recognized that the required quantity of raw material may be reduced by use of polyethylene film having the previously mentioned high strength characteristics, and in part for this reason, multiple layer plastic films have been used to manufacture garbage bags.

With the introduction of "linear" low density polyethylenes made by the low pressure processes (hereinafter referred to as "LPLDPE"), attempts have been made to substitute this material for film applications in place of conventional highly branched low density polyethylenes made by high pressure processes (hereinafter referred to as "HPLDPE"). The reason for these efforts is that LPLDPE is widely recognized as being tougher and stronger than HPLDPE. However, it has been discovered that the machine direction (MD) Elmendorf tear strength for LPLDPE film is substantially lower than HPLDPE film, even though other physical properties of LPLDPE are superior.

The prior art polyethylene film-type bags have thus been characterized by either limited strength properties except for high MD tear strength, with relatively low extruder power requirement and low extruder head pressure on one hand, or characterized by high strength properties, but with only moderate MD tear strength, and relatively high extruder power requirement and high extruder head pressure on the other hand.

In addition, polyethylene film for the production of consumer garbage and trash bags is generally prepared in the thickness range of between about 1.5 mils and about 3.0 mils. As earlier indicated, it is customary for low density polyethylene, produced by the standard high pressure process, to be used as the basic polymer or raw material for this product because of its relatively low cost, good physical properties, ease of extrusion at high rates, good heat seal strength, and ability to be readily converted into the finished product.

There is, however, a continuous need for stronger films for this application which will be even more resistant to damage by puncture, tearing, or yielding under stress. A stronger film is not only desirable from the standpoint that the finished bag is more serviceable in the end-use, but also in that a thinner film can be used and still meet the necessary strength requirements, thus providing a better cost-performance relationship for the consumer.

Accordingly, it is an object of this invention to provide a multi-layer polyethylene film possessing improved puncture toughness, tensile strength, yield strength and tear strength over conventional multi-layer polyethylene films.

It is another object of this invention to provide a multi-layer polyethylene film having higher transverse direction tear strength than high pressure, low density polyethylene.

It is another object of this invention to provide a multi-layer polyethylene film having a relatively higher machine direction tear strength than low density copolymers formed from monomers such as ethylene and butene.

These objects, and others, will be apparent from a reading of the following description of the invention and the appended claims.

In accordance with the present invention, there is provided a multi-layer film suitable for use in the manufacture of garbage and trash bags which, in one embodiment, comprises a first outer layer of a high pressure low density polyethylene, a core layer of low pressure, low density gas phase heterogeneous ethylene copolymers; and a second outer layer of a high pressure low density polyethylene. It has been found that the multilayer film of this invention has physical properties, such as puncture toughness, tensile strength, particularly transverse machine direction tensile strength and yield strength, which are substantially improved over those of conventional multilayer films made from high pressure, low density polyethylene in all layers thereof. Surprisingly, the machine direction tear strength observed for the co-extruded multilayer film remains high even as the density of the heterogeneous ethylene copolymers is increased, from 0.917 to 0.928 as shown in the examples and subsequent discussion relative thereto. It is expected, ordinarily, that as density is increased, machine direction tear strength decreases in a blown film of this type. A higher machine direction tear strength results in a more balanced film (machine direction versus transverse direction) which is highly desirable from an end-use standpoint. In addition, the fact that the machine direction tear strength is not lowered as density is increased allows the use of the higher density copolymers with their higher modulus and higher yield strength.

Consequently, it has been found that a multilayered, coextruded film comprising the low pressure, low density gas phase heterogeneous copolymer resins of this invention as one or more layers, and high pressure, low density polyethylene or blends of high pressure, low density polyethylene and low pressure, low density gas phase heterogeneous copolymer resins as one or more outer layers of the co-extruded film results in a superior, stronger film and trash bag.

The multilayered structure having high pressure, low density polyethylene as an outer layer is particularly desirable in order to gain freedom from melt fracture of the layer of copolymers at high output rates and to aid in increasing the melt strength of the extrudate in order to improve bubble or melt cooling at higher output rates.

The copolymer layer of the multilayer film of this invention comprises heterogeneous copolymers formed from ethylene, and at least one of propylene and butene-1 and at least one $C_5$–$C_8$ comonomer. By the term heterogeneous, it is meant that the comonomer units are distributed randomly along a polymer chain but do not have the same ethylene/comonomer ratio among the polymer molecules. The ethylene copolymers are interpolymers or copolymers of the monomers $C_2$, $C_a$ and $C_b$, wherein $C_2$ is ethylene, $C_a$ is selected from propylene, butene-1 and mixtures thereof, and $C_b$ is selected from one or more of the $C_5$ to $C_8$ alpha monoolefins which contain no branching closer than the fourth carbon atom. The $C_5$ to $C_8$ monomers include pentene-1, 4-methyl pentene-1, hexene-1, heptene-1 and octene-1.

The $C_2$, $C_a$ and $C_b$ monomer units are believed to be randomly distributed along the polymer chain and do not have the same ethylene/comonomer ratio among the polymer molecules. The molar ratio of $C_a/C_2$ monomer units in the polymer mass is about 0.006 to 0.09. The molar ratio of $C_b/C_2$ monomer units in the polymer mass is about 0.003 to 0.07. In addition, the $C_a$ and $C_b$ monomers are also used in such amounts as to provide a Branch Chain Factor value of about 0.1 to 0.9 and preferably of about 0.2 to 0.8, where the $$\text{Branch Chain Factor} = \frac{\text{number of carbon branches of } C_3 \text{ to } C_6 \text{ length in polymer}}{\text{total number of carbon branches (of } C_1 \text{ to } C_6 \text{ length) in polymer.}}$$

The copolymers have a density of about 0.91 to 0.94, a melt flow ratio of $\geq 22$ to 23 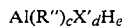 and preferably of about $\geq 25$ to $\leq 32$, and
a melt index of about 0.5 to 5.0.

The melt flow ratio value is one means of indicating the molecular weight distribution of a polymer. The melt flow ratio (MFR) range of $\geq 22$ to $\leq 36$ thus corresponds to $M_w/M_n$ value range of about 2.7 to 4.3 and the MFR range of $\geq 25$ to $\leq 32$ corresponds to a $M_w/M_n$ range of about 2.8 to 3.8.

The copolymers of the present invention have an unsaturated group content of $\leq 1$, and usually of $\geq 0.1$ to $\leq 0.6$, C=C/1000 carbon atoms.

The copolymers can be readily produced in a low pressure gas phase fluid bed reaction process, as disclosed below, if a specific monomer charge is polymerized under a specific set of operating conditions, as disclosed below, and in the presence of a specific high activity catalyst, which is also described below.

HIGH ACTIVITY CATALYST

The compounds used to form the high activity catalyst used in the present invention comprise at least one titanium compound, at least one magnesium compound, at least one electron donor compound, at least one activator compound, and at least one porous inert carrier material, as defined below.

The titanium compound has the structure $$\text{Ti(OR)}_a X_b$$

wherein
R is a $C_1$ to $C_{14}$ aliphatic or aromatic hydrocarbon radical, or COR' where R' is a $C_1$ to $C_{14}$ aliphatic or aromatic hydrocarbon radical,
X is selected from the group consisting of Cl, Br, I, or mixtures thereof, a is 0 or 1, b is 2 to 4 inclusive and a+b=3 or 4.

The titanium compounds can be used individually or in combinations thereof, and would include $TiCl_3$ and $TiCl_4$, $Ti(OCH_3)Cl_3$, $Ti(OC_6H_5)Cl_3$ and $Ti(OCOC_6H_5)Cl_3$.

The magnesium compound has the structure $$MgX_2$$

wherein X is selected from the group consisting of Cl, Br, I, or mixtures thereof. Such magnesium compounds can be used individually or in combinations thereof and would include $MgCl_2$, $MgBr_2$ and $MgI_2$. Anhydrous $MgCl_2$ is the particularly preferred magnesium compound.

About 0.5 to 56, and preferably about 1 to 10, mols of the magnesium compound are used per mol of the titanium compound in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are partially or completely soluble. The electron donor compounds are known as such, or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids, alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, preferably $C_3$ to $C_4$, aliphatic ketones. The most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure $$Al(R'')_c X'_d H_e$$

wherein X' is Cl or OR''', R'' and R''' are the same or different and are $C_1$ to $C_{14}$ saturated hydrocarbon radicals, d is 0 to 1.5, e is 1 or 0 and c+d+e=3.

Such activator compounds can be used individually or in combinations thereof and would include $Al(C_2H_5)_3$, $Al(C_2H_5Cl)Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

About 10 to 400, and preferably about 10 to 100, mols of the activator compound are used per mol of the titanium compound in activating the catalyst employed in the present invention.

The carrier materials are solid, particulate porous materials which are inert to the other components of the catalyst composition, and to the other active components of the reaction system. These carrier materials would include inorganic materials such as oxides of silicon and/or aluminum. The carrier materials are used in the form of dry powders having an average particle size of about 10 to 250, and preferably of about 50 to 150 microns. These materials are also porous and have a surface area of $\geq 3$, and preferably of $\geq 50$, square meters per gram. Catalyst activity or productivity is apparently also improved with silica having pore sizes of $\geq 80$ Angstrom units and preferably of $\geq 100$ Angstrom units. The carrier material should be dry, that is, free of absorbed water. Drying of the carrier material is carried out by heating it at a temperature of $\geq 600°$ C. Alternatively, the carrier material dried at a temperature of $\geq 200°$ C. may be treated with about 1 to 8 weight percent of one or more of the aluminum alkyl compounds described above. This modification of the support by the aluminum alkyl compounds provides the catalyst compositions with increased activity and also improves polymer particle morphology of the resulting ethylene polymers.

The copolymer polymerization reaction is conducted by contacting a stream of the monomers, in a gas phase process, such as in a fluid bed process as described in U.S. Pat. No. 4,243,619 and substantially in the absence of catalyst poisons such as moisture, oxygen, carbon monoxide, carbon dioxide and acetylene with a catalytically effective amount of the completely activated precursor composition (the catalyst) impregnated on a support at a temperature and a pressure sufficient to initiate the polymerization reaction.

In order to achieve the desired density ranges in the copolymers it is necessary to copolymerize enough of the (i) $C_a$ comonomers with ethylene and the $C_b$ comonomers to achieve a level of about $\geq 0.6$ to 9 mol percent of the $C_a$ comonomer in the copolymer, and (ii) $C_b$ comonomers with ethylene and the $C_a$ comonomers to achieve a level of about $\geq 0.3$ to 7 mol percent of the $C_b$ comonomer in the copolymer. The amounts of the $C_a$ and $C_b$ comonomers needed to achieve this result will depend on the particular comonomers employed.

There is provided below a listing of the amounts, in mols, of various $C_a$ and $C_b$ comonomers that are copolymerized with ethylene in order to provide polymers having the desired density range at any given melt index. The listing also indicates the relative molar concentration, of such comonomers to ethylene, which are to be present in the recycled gas stream of monomers ($C_2$, $C_a$ and $C_b$) under reaction conditions in the reactor.

| Cx comonomer | $Cx/C_2$ mol Ratio in gas phase at equilibrium | $Cx/C_2$ mol Ratio in polymer |
| --- | --- | --- |
| propylene | 0.2 to 0.9 | 0.01 to 0.09 |
| butene-1 | 0.1 to 0.5 | 0.006 to 0.08 |
| pentene-1 | 0.05 to 0.2 | 0.005 to 0.07 |
| hexene-1 | 0.02 to 0.15 | 0.004 to 0.06 |
| 4-methyl-pentene-1 | 0.02 to 0.15 | 0.004 to 0.06 |
| heptene-1 | 0.017 to 0.10 | 0.003 to 0.04 |
| octene-1 | 0.015 to 0.08 | 0.003 to 0.04 |

The fluid bed reactor is operated at pressures of from about 50 to about 1000 psi, and is preferably operated at a pressure of from about 150 to 350 psi, with operation at the higher pressures in such ranges favoring heat transfer since an increase in pressure increases the unit volume heat capacity of the gas.

As earlier disclosed, the at least one layer of the multilayer film of this invention comprises heterogeneous copolymers formed from ethylene, and at least one of propylene and butene-1 and at least one $C_5-C_8$ comonomer. These copolymers generally have a melt index of between about 0.5 and about 5.0 decigrams per minute and a density of between about 0.91 and about 0.94 grams per cubic centimeter. However, it is preferred that the copolymers have a melt index of between about 0.5 and about 2.0 decigrams per minute and a density of between about 0.926 and about 0.930 grams per cubic centimeter because a better balance of physical properties is provided to the multilayer film of this invention.

Likewise, it is preferred that the copolymer layer of the multilayer film of this invention comprise a member selected from the group consisting of ethylene-butene-hexene and ethylene-propylene-hexene. In addition, the copolymer layer of the multilayer film of this invention may be as thick as commercially practical while the other layer or layers may contain sufficient high pressure, low density polyethylene to prevent melt fracture during bubble cooling at high output rates and also insure even distribution of the outer layers around the circumference of the die and bubble. Thus, the copolymer layer may have a thickness of up to about 90 percent of the total thickness of the multilayer film of this invention, and the other layer or layers may comprise a thickness of about 5 to about 10 percent of the total thickness of the multilayer film providing that the die design allows even distribution of the other layer melt or melts around the circumference of the copolymer layer. However, it is preferred that the copolymer layer has a thickness of between about 50 percent and about 80 percent of the total thickness of the multilayer film of this invention, and the other layer or layers have a thickness of between about 20 percent and about 50 percent of the total thickness of the multilayer film.

In addition, the multilayer film composition of this invention may comprise a first film layer of heterogeneous copolymers formed from ethylene and at least one of propylene and butene-1, and at least one $C_5-C_8$ comonomer; and a second film layer comprising high pressure, low density polyethylene or a blend of said high pressure, low density polyethylene and said aforementioned heterogeneous copolymers. When so constructed, it is preferred that said first film layer comprise up to about 70 percent of the total thickness of the multilayer film and said second film layer may comprise the remaining thickness of the total thickness of the multilayer film. In similar fashion, the multilayer film composition of this invention may comprise a first film layer of heterogeneous copolymers formed from ethylene and at least one of propylene and butene-1 and at least one $C_5-C_8$ comonomer, to which a colorant selected from a pigment or dye such as green or black may be added; a second film layer comprising heterogeneous copolymers formed from ethylene and at least one of propylene and butene-1 and at least one $C_5-C_8$ comonomer; and a third film layer comprising high pressure, low density polyethylene or a blend of said polyethylene and said heterogeneous copolymers formed from ethylene and at least one of propylene and butene-1 and at least one $C_5-C_8$ comonomer to which a colorant may also be added. When so constructed, it is preferred that said first and second film layers comprise up to about 70 percent of the total thickness of the multilayer film, and said third film layer comprise the remaining thickness of the total thickness of the multilayer film.

Further, the multilayer film composition of this invention may comprise a first film layer of high pressure, low density polyethylene containing a colorant selected from a pigment or dye such as green in color, and a second film layer comprising heterogeneous copolymers formed from ethylene and at least one of propylene and butene-1 and at least one $C_5-C_8$ comonomer containing a colorant selected from a pigment or dye such as black in color and a minor amount of high pressure, low density polyethylene. With these materials the thickness of the multilayer film should comprise between about 20 to 25 percent from said first film layer, and between about 75 to 80 percent from said second film layer. Still further, the multilayer film composition of this invention may comprise a first outer layer comprising high pressure, low density polyethylene or heterogeneous copolymers formed from ethylene and at least one of propylene and butene-1 and at least one $C_5$–$C_8$ comonomer a core layer comprising high pressure, low density polyethylene or heterogeneous copolymers formed from ethylene and at least one of propylene and butene-1 and at least one $C_5$–$C_8$ comonomer or a blend thereof, and a second outer layer comprising high pressure, low density polyethylene or a blend of high pressure, low density polyethylene and heterogeneous copolymers formed from ethylene and at least one of propylene and butene-1 and at least one of propylene and butene-1 and at least one $C_5$–$C_8$ comonomer, however, it being understood that high pressure, low density polyethylene would not be present exclusively in all layers. Yet further, the multilayer film composition of this invention may comprise a first outer layer of high pressure, low density polyethylene, a core layer and a second outer layer each of which may comprise heterogeneous copolymers formed from ethylene and at least one of propylene and butene-1 and at least one $C_5$–$C_8$ comonomer. In this construction, the heterogeneous copolymers of the core layer and the second outer layer may have different densities, different melt indexes, and may contain a colorant such as a pigment or dye as previously disclosed. Further still, the multilayer film composition of this invention may comprise a first outer layer of high pressure, low density polyethylene, a core layer comprising one or more layers wherein at least one of the layers comprises heterogeneous copolymers formed from ethylene and at least one of propylene and butene-1 and at least one $C_5$–$C_8$ comonomer, and a second outer layer comprising heterogeneous copolymers formed from ethylene and at least one of propylene and butene-1 and at least one $C_5$–$C_8$ comonomer.

As earlier indicated, the multilayered, coextruded film composition of this invention results in a superior, stronger film and trash/garbage bags. In addition, melt fracture during extrusion is reduced. To provide further reduction in melt fracture during extrusion of the aforementioned 2-layer film structures, it is preferred that the polymers be extruded, as disclosed by S. J. Kurtz in U.S. Pat. No. 4,348,349 and assigned to the present assignee, through a die having a discharge outlet defining an exit die gap formed by opposing die lip surfaces and wherein one surface of the die lip and/or die land in contact with the molten polymer extends beyond the opposing surface of the die lip and/or die land in the direction of the axis of flow of the molten polymer through the die exit whereby melt fracture is reduced on the surface of the polymer leaving the extended die lip surface. It should be noted that use of such extrusion die is not necessary to reduce melt fracture when extruding a 3 or more layered film wherein high pressure, low density polyethylene forms the outer layers of the film composition. Further, when preparing a 2-layer film structure for use as a trash or garbage bag in accordance with this invention, it is preferred that the outside layer comprise the heterogeneous copolymers formed from ethylene and at least one of propylene and butene-1 and at least one $C_5$–$C_8$ comonomer.

The total thickness of the multilayer film is generally between about 1 mil and about 3 mils. Substantially thinner films would usually not be suitable because the strength properties of the film would be unacceptably low for use as a trash or garbage bag. Films substantially thicker than 3 mils are not preferred since the additional strength associated with thicker material is ordinarily not required for trash-garbage bag usage. A further disadvantage of thicker films would be difficulty in handling and tying the bag open end. A preferred balance of these opposing considerations is a film between about 1.3 and 1.8 mils thick. The other layer or layers of the multilayer film of this invention may comprise a high pressure, low density polyethylene having a melt index of between about 0.5 and about 5.0 decigrams per minute and a density of between about 0.916 and 0.935 grams per cubic centimeter. However, it is preferred that the high pressure, low density polyethylene have a melt index of between about 1.0 and about 3.0 decigrams per minute and a density of between about 0.918 and about 0.922 grams per cubic centimeter because better physical properties are obtained for the multilayer film. High pressure, low density polyethylene (HPLDPE) has been commercially available for many years and the highly branched homopolymer is generally made with a free radical catalyst at pressures typically above 15,000 psi, usually in elongated tubular reactors.

Illustrative, non-limiting examples of the features and practice of the invention are set out below. The parts and percentages set forth herein refer to parts by weight and percentages by weight, respectively, unless specifically stated otherwise.

In the following examples, the sample multilayer films were formed by co-extrusion of the film layers through a tubular die.

All the multilayer film compositions were prepared by extruding the outer layers through each of two separate 1½ inch extruders while the core layer was extruded through a 3½ inch extruder. The multilayer die used to form the extruded bubble was a 12 inch three layer spiral manifold die. The extruded film flatwidth was 36 inches. The layer thickness ratio of first outer layer to core layer to second outer layer was 1:3:1 in all the samples prepared. The material employed for the first and second outer layers in all the examples was high pressure, low density polyethylene having a melt index of about 2.0 decigrams per minute and a density of about 0.918 grams/cm$^3$. Also the first outer layer was pigmented with about 5% of a light green pigment, and the second outer layer was pigmented with about 4% black pigment. In addition, both outer layers contained a total of about 1.2% of slip and anti-block agents. The core layer in all the compositions was unpigmented and contained no slip or anti-block agent. In Table 1, only the compositions of the core layer employed are shown.

TABLE 1

| EXAMPLE | ETHYLENE-BUTENE-HEXENE HETEROGENEOUS COPOLYMER | | | | | ETHYLENE-BUTENE-1 COPOLYMER | | | CONTROL HP-LDPE |
|---|---|---|---|---|---|---|---|---|---|
|  | 1 | 2 | 3 | 4 | 5 | 6 | 7 | 8 | 9 |
| Melt index (dgm/min) | 1.75 | 2.0 | 2.0 | 2.0 | 1.75 | 2.0 | 2.0 | 2.0 | 2.0 |
| Density (gm/cm$^3$) | .917 | .922 | .9235 | .9276 | .928 | .917 | .920 | .926 | .918 |

TABLE 1-continued

| EXAMPLE | ETHYLENE-BUTENE-HEXENE HETEROGENEOUS COPOLYMER | | | | | ETHYLENE-BUTENE-1 COPOLYMER | | | CONTROL HP-LDPE |
|---|---|---|---|---|---|---|---|---|---|
| | 1 | 2 | 3 | 4 | 5 | 6 | 7 | 8 | 9 |
| Puncture Toughness | | | | | | | | | |
| Load (lb/mil) | 5.4 | 4.6 | 4.4 | 4.5 | 5.3 | 3.9 | 4.5 | 3.9 | 3.9 |
| Energy (in-lb/mil) | 10.5 | 7.3 | 7.0 | 7.3 | 9.0 | 6.4 | 7.6 | 5.6 | 3.5 |
| Elmendorf Tear Strength (gms/mil) | | | | | | | | | |
| MD | 101 | 123 | 99 | 95 | 101 | 82 | 71 | 56 | 359 |
| TD | 503 | 406 | 390 | 403 | 426 | 308 | 316 | 308 | 94 |
| Tensile Strength (psi) | | | | | | | | | |
| MD | 2810 | 3480 | 2730 | 3280 | 3160 | 2690 | 2880 | 2660 | 2790 |
| TD | 2850 | 3040 | 2760 | 3040 | 3140 | 3280 | 2940 | 2720 | 1900 |
| Yield Strength (psi) | | | | | | | | | |
| MD | 1500 | 1500 | 1470 | 1620 | 1650 | 1280 | 1430 | 1620 | 1310 |
| TD | 1540 | 1530 | 1550 | 1640 | 1820 | 1400 | 1550 | 1670 | 1400 |

Further, in Table 1, the following test criteria were used. Tensile strength was measured by ASTM D882 method A. Load at break was reported in pounds per square inch.

Elmendorf tear strength was measured by ASTM D1992 and is reported in grams (gms) per mil.

Puncture toughness is a test originated to evaluate the relative resistance of a film to being punctured. There is no ASTM standard. Basically, a ¾ inch round steel plunger is pushed through a clamped film specimen at a speed of 20 inches per minute using a modified Instron Tester. The load to puncture of the film specimen is recorded in pounds (lbs) per mil and the energy to puncture is the integrated area under the load-elongation curve and is recorded in inch-pounds (inch-lbs) per mil.

Melt index was determined by ASTM D-1238—Condition E—measured at 190° C. and reported as grams per 10 minutes.

MD signifies machine direction, and TD signifies transverse direction.

Examination of the data in Table 1 shows that a multilayer film composition containing an ethylene-butene-hexene polymer as the core layer, i.e., examples 1 to 5, has superior and improved physical properties over such a multilayer film composition containing as the core layer either an ethylene-butene copolymer, i.e., examples 6 to 8, or a high pressure low density polyethylene, i.e., example 9.

More specifically, the multilayer films containing ethylene-butene-hexene polymer as the core layer (examples 1 through 5) demonstrate that the MD Elmendorf tear strength is essentially unchanged and remains at a relatively high level of 95–123 gms/mil as the density of the ethylene-butene-hexene polymer increases from 0.917 to 0.928, respectively. This is unexpected in that, generally, as density increases MD Elmendorf tear strength usually decreases as demonstrated by examples 6, 7 and 8 which contain core layers of ethylene-butene copolymers of varying densities. In these examples, the MD Elmendorf tear strength decreases from 82 gms/mil to 56 gms/mil as would be expected as the density of the ethylene-butene copolymer increases from 0.917 to 0.926.

The improvements of the core layer products of examples 1 through 5 over the all high pressure, low density polyethylene control composition (example 9) and conventional copolymers (examples 6-8) are evident when samples 1 through 9 are compared with respect to important strength properties such as Puncture toughness energy, TD Elmendorf tear strength, and TD Tensile strength.

The advantage of increasing density of the polymers of the core layer without lowering MD Elmendorf tear is further highlighted by noting the increase in TD (trash bag lift direction) yield strength as the density increases.

In Table 2, the degree of improvement in various properties provided by the multilayer films of examples 1 to 5 over control example 9 is summarized. It is to be noted in particular that the greater improvements in tensile and yield strength can be obtained without sacrifice in machine direction tear strength.

TABLE 2

| Comparative Results With Control | |
|---|---|
| Property | Degree of Improvement |
| puncture toughness | |
| load | +13% to +38% |
| energy | +100% to +204% |
| tensile strength | |
| machine direction | −2% to +25% |
| transverse direction | +45% to +65% |
| yield strength | |
| machine direction | +13% to +25% |
| transverse direction | +10% to +30% |

Although preferred embodiments of this invention have been described in detail, it is contemplated that modifications thereof may be made and that some features may be employed without others, all within the spirit and scope of the invention. For example, although the films described in the foregoing examples were prepared by bubble extrusion, other preparative methods may be used as, for example, slot cast extrusion.

What is claimed is:

1. A coextruded multilayer film comprising a first outer layer of low pressure, low density gas phase heterogeneous copolymers formed from ethylene and at least one of propylene and butene-1 and at least one $C_5$-$C_8$ comonomer, and a second outer layer comprising high pressure, low density polyethylene, said copolymers having a melt index of between about 0.5 and about 5.0 decigrams per minute, and a density of between about 0.91 and about 0.94 grams per cubic centimeter.

2. A coextruded multilayer film as in claim 1 wherein said second outer layer comprises a blend of said polyethylene and said heterogeneous copolymers formed from ethylene and at least one of propylene and butene-1 and at least one $C_5$–$C_8$ comonomer.

3. A coextruded multilayer film as in claim 1 wherein said first outer layer comprises more than one layer of said heterogeneous copolymers.

4. A coextruded multilayer film as in claim 3 including a colorant in at least one of said layers.

5. A coextruded multilayer film as in claim 1 wherein said copolymers have a melt index of between about 0.5 and about 2.0 decigrams per minute and a density of between about 0.926 and about 0.930 grams per cubic centimeter.

6. A coextruded multilayer film as in claim 1 wherein said first outer layer has a thickness of between about 50 percent and about 80 percent, and said second outer layer has a thickness of between about 20 percent and about 50 percent of the total thickness of said multilayer film.

7. A coextruded multilayer film as in claim 1 wherein the thickness of said multilayer film is between about 1 mil and about 3 mils.

8. A coextruded multilayer film as in claim 1 wherein said high pressure, low density polyethylene has a melt index of between about 0.5 and about 5.0 decigrams per minute and a density of between about 0.916 and 0.935 grams per cubic centimeter.

9. A coextruded multilayer film as in claim 1 wherein said heterogeneous copolymers are selected from the group consisting of ethylene-butene-hexene and ethylene-propylene-hexene.

10. A coextruded multilayer film as in claim 1 wherein said film is formed into a bag.

11. A coextruded multilayer film comprising a first layer of low pressure, low density gas phase heterogeneous copolymers formed from ethylene and at least one of propylene and butene-1 and at least one $C_5$–$C_8$ comonomer, a second layer comprising low pressure, low density gas phase heterogeneous copolymers formed from ethylene and at least one of propylene and butene-1 and at least one $C_5$–$C_8$ comonomer, and a third layer comprising high pressure, low density polyethylene, said copolymers having a melt index of between about 0.5 and about 5.0 decigrams per minute, and a density of between about 0.91 and about 0.94 grams per cubic centimeter.

12. A coextruded multilayer film as in claim 11 wherein said third layer comprises a blend of said polyethylene and said heterogeneous copolymers formed from ethylene and at least one of propylene and butene-1 and at least one $C_5$–$C_8$ comonomer.

13. A coextruded multilayer film as in claim 11 including a colorant in at least one of said layers.

14. A coextruded multilayer film as in claim 11 wherein said film is formed into a bag.

15. A coextruded multilayer film comprising a first outer layer of high pressure, low density polyethylene, a core layer comprising one or more film layers wherein at least one of said film layers consists essentially of low pressure, low density gas phase heterogeneous copolymers formed from ethylene and at least one of propylene and butene-1 and at least one $C_5$–$C_8$ comonomer, and a second outer layer consisting essentially of low pressure, low density gas phase heterogeneous copolymers formed from ethylene and at least one of propylene and butene-1 and at least one $C_5$–$C_8$ comonomer, said copolymers having a melt index of between about 0.5 and about 5.0 decigrams per minute, and a density of between about 0.91 and about 0.94 grams per cubic centimeter.

16. A coextruded multilayer film as in claim 15 wherein said film is formed into a bag.

17. A coextruded multilayer film as in claim 15 wherein said first outer layer comprises a blend of said high pressure, low density polyethylene and said heterogeneous copolymers formed from ethylene and at least one of propylene and butene-1 and at least one $C_5$–$C_8$ comonomer.

18. A coextruded multilayer film as in claim 15 including a colorant in at least one of said layers.

19. A coextruded multilayer film as in claim 15 wherein the thickness of said multilayer film is between about 1 mil and about 3 mils.

20. A coextruded multilayer film as in claim 15 wherein said high pressure, low density polyethylene has a melt index of between about 0.5 and about 5.0 decigrams per minute and a density of between about 0.916 and 0.935 grams per cubic centimeter.

21. A coextruded multilayer film as in claim 15 wherein said heterogeneous ethylene copolymers are selected from the group consisting of ethylene-butene-hexene and ethylene-propylene-hexene.

* * * * *